United States Patent
Smith

(10) Patent No.: US 6,418,663 B1
(45) Date of Patent: Jul. 16, 2002

(54) POTTED PLANT WATERING APPARATUS

(76) Inventor: Wesley Paul Smith, 7610 S. Wildberry Ave., Tucson, AZ (US) 85747

( * ) Notice: Subject to any disclaimer, the term of this patent is extended or adjusted under 35 U.S.C. 154(b) by 0 days.

(21) Appl. No.: 09/557,499

(22) Filed: Apr. 24, 2000

Related U.S. Application Data

(60) Provisional application No. 60/188,611, filed on Mar. 8, 2000.

(51) Int. Cl.[7] .............................................. A01G 25/00
(52) U.S. Cl. ............................................ 47/79; 47/48.5
(58) Field of Search ............................. 47/79, 65.5, 80, 47/81, 66.1, 48.5, 66.6

(56) References Cited

U.S. PATENT DOCUMENTS

| | | | | |
|---|---|---|---|---|
| 2,278,991 A | * | 4/1942 | Hasslacher et al. | 47/79 |
| 3,084,666 A | * | 4/1963 | Plaisance | 47/79 |
| 4,787,169 A | * | 11/1988 | Maxfield et al. | 43/57 |
| 4,903,432 A | * | 2/1990 | Velagaleti et al. | 47/81 |
| 5,546,700 A | * | 8/1996 | Kumpf | 47/79 |
| 5,820,029 A | * | 10/1998 | Marans | 239/542 |
| 6,027,048 A | * | 2/2000 | Mehoudar | 239/542 |
| 6,185,866 B1 | * | 2/2001 | Enfaradi | 47/79 |

* cited by examiner

*Primary Examiner*—Charles T. Jordan
*Assistant Examiner*—Judith A. Nelson
(74) *Attorney, Agent, or Firm*—Gavin J. Milczarek-Desai; Durando Birdwell & Janke, P.L.C.

(57) ABSTRACT

An irrigation system for a potted plant in which a reservoir is mounted onto the upper lip of the pot. The reservoir communicates a slow feed of water into the pot to provide water to the plant through a wick mechanism which slowly drains the reservoir into the pot. The preferred embodiment is a single round reservoir that fits around the entire rim of the planter. Other embodiments of the invention provide for a segmented reservoir which also extends around the entire rim and which uses multiple reservoirs which are "snapped" or otherwise secured to each other to form a ring.

21 Claims, 6 Drawing Sheets

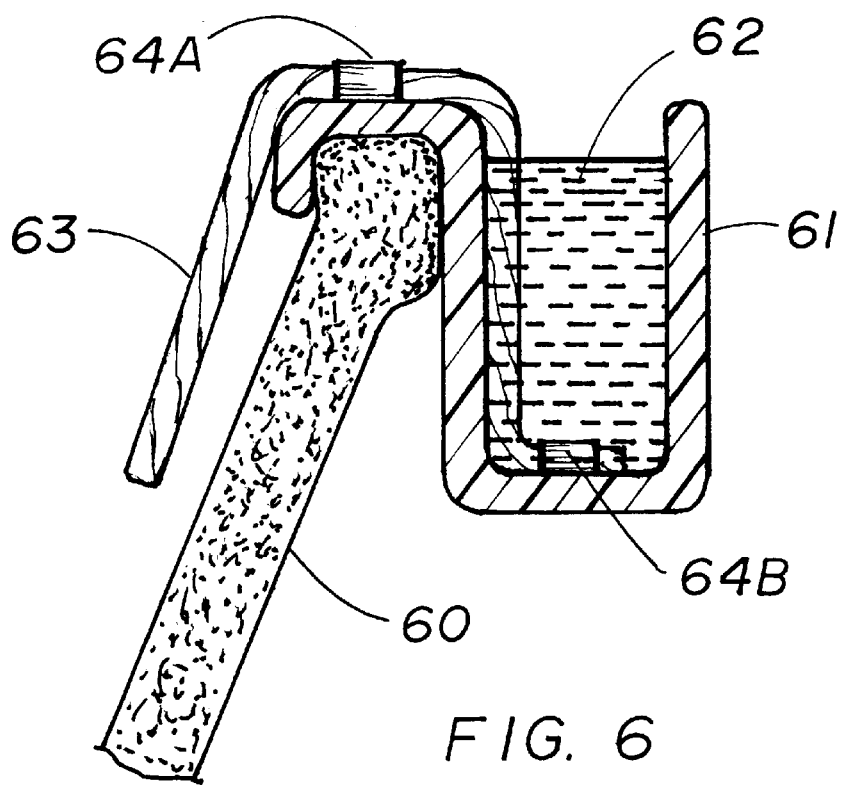
FIG. 6
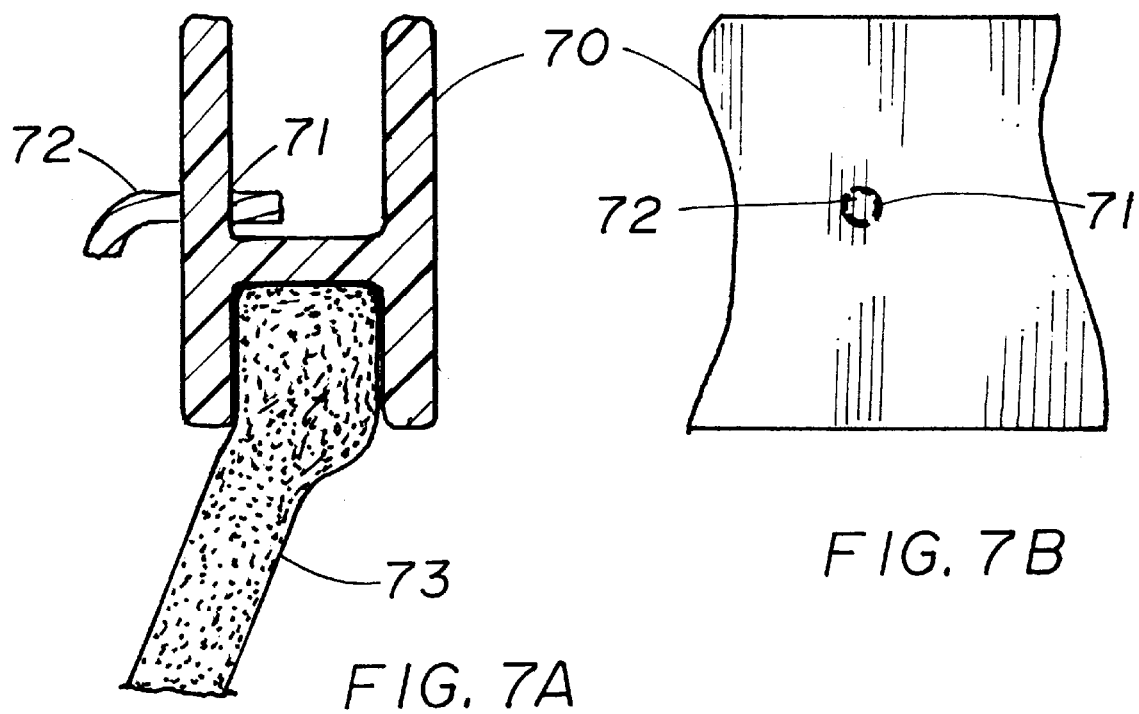
FIG. 7A
FIG. 7B

POTTED PLANT WATERING APPARATUS

Priority for this application is claimed from U.S. Provisional Patent application serial No. 60/188,611, filed on Mar. 8, 2000, and entitled "Potted Plant Watering Apparatus".

BACKGROUND OF THE INVENTION

This invention relates generally to plants and more particularly to watering plants which are contained within a pot.

Within a typical household, there are a variety of potted plants. Often the pots range in size from a few inches to two feet across. While maintenance of the plants requires irregular fertilizing and pruning, watering the plant must be done on a regular basis to maintain the plant's health.

While everyone knows the importance of regular watering, maintaining a consistent schedule proves to be very difficult and often the plants is "stressed" between watering.

To assist in eliminating this problem, a variety of solutions have been attempted. One method places a hollow spike into the planter. Water placed within the hollow spike is slowly released into the surrounding soil. This technique is described in U.S. Pat. No. 5,259,142, issued on Nov. 9, 1993, to Sax and entitled, "Plant Irrigation Device", incorporated hereinto by reference.

While this mechanism works relatively well, it is difficult to visually gauge when the spike needs to be refilled; and, the reservoir created by the spike is relatively small, not allowing the watering from the spike to work over an extended period of time.

Another method used to increase the water retention within a planter pot is the use of polymers which absorb water. This prevents the water from draining through the pot; and, the polymers slowly release the water for the plant's use.

Polymers though do not collect a vast amount of water, usually on the order of four times the weight of the polymer; hence, if two ounces of polymer is added (an excessive amount), the polymer will only hold about eight ounces of water. This amount is relatively insignificant and will not assist over a long period of time.

It is clear there is a need for a more reliable apparatus for irrigating potted plants.

SUMMARY OF THE INVENTION

The present invention utilizes a reservoir which mounts onto the upper lip of the pot. The reservoir communicates a slow feed of water into the pot to provide water to the plant.

While one embodiment of the invention provides for the reservoir to be incorporated into the pot itself, the preferred embodiment is an "add-on" which is secured to the rim and then filled with water.

With the reservoir mounted at the rim, the home-owner is able to easily check to see if the reservoir needs to be refilled or not.

The preferred embodiment is a single round reservoir that fits around the entire rim of the planter. Other embodiments of the invention provide for a segmented reservoir which also extends around the entire rim and which uses multiple reservoirs which are "snapped" or otherwise secured to each other to form a ring.

In yet another embodiment of the invention, the reservoir does not extend around the entire rim but rather is hung from the rim and addresses only a portion of the rim. This embodiment is easy to "hide" to maintain the aesthetics of the original pot.

The water is communicated to the interior of the pot via a variety of controlled delivery apparatus. The preferred embodiment uses a wick mechanism which slowly draws water from the reservoir and drips it into the pot.

While the wick is the preferred embodiment, other embodiments utilize an emitter such as those described in: U.S. Pat. No. 5,820,029, issued to Marans on Oct. 13, 1998, and entitled "Drip Irrigation emitter"; or, U.S. Pat. No. 6,027,048, issued to Mehoudar on Feb. 22, 2000, and entitled "Irrigation Emitter Unit", both of which are incorporated hereinto by reference.

The use of emitters allows the home-owner/user to easily adjust the amount of water being delivered to the plant.

In another embodiment of the invention, a second reservoir, such as a plastic bottle, is used to feed water into the primary reservoir. This embodiment of the invention is usefull for when the home-owner/user is going to be absent for an extended period of time to maintain a consistent watering of the plant within the pot.

The invention, together with various embodiments thereof will be more fully explained by the accompanying drawings and the following description thereof.

DRAWINGS IN BRIEF

FIGS. 1A, 1B, 1C, and 1D illustrate a cutaway view, an assembly perspective, an assembled perspective, and a cutaway operational view respectively of the preferred embodiment.

FIG. 6 illustrates an embodiment of the invention wherein the reservoir hangs below the rim of the planter.

FIGS. 7A and 7B are side and frontal views of an embodiment of the invention in which the wick is used to occlude an opening at the bottom of irrigation reservoir.

DRAWINGS IN DETAIL

Figure 1A:
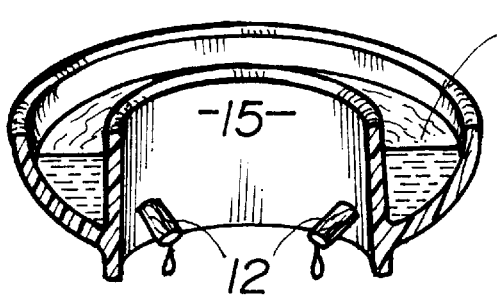
Figure 1D:
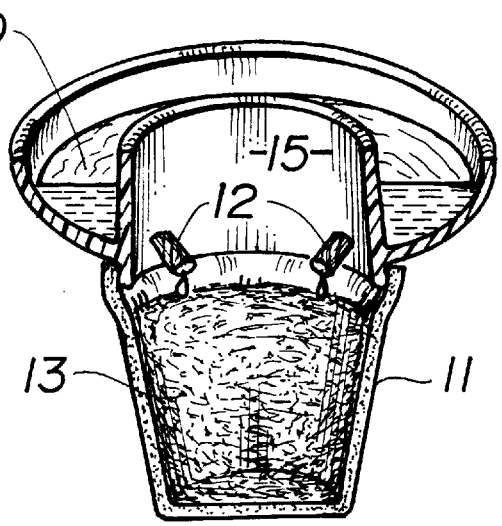
Figure 1B:
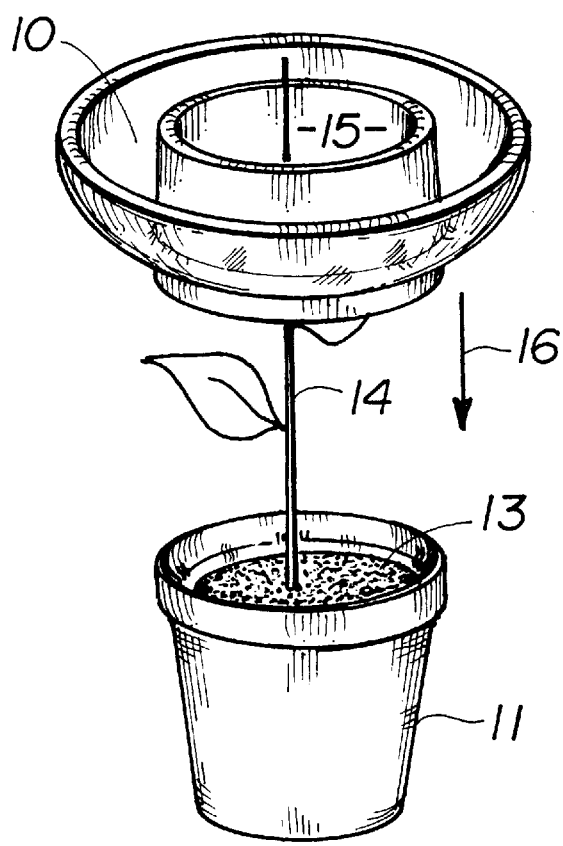
Figure 1C:
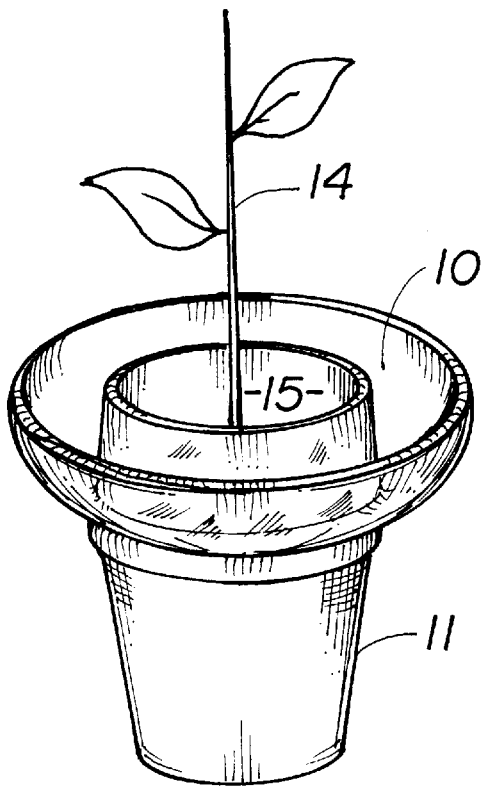

For the preferred embodiment, FIGS. 1A, 1B, 1C, and 1D illustrate a cutaway view, an assembly perspective, an assembled perspective, and a cutaway operational view respectively.

The irrigation system of this invention includes reservoir 10 which communicates with a central opening 15 via wicks 12. When placed over a planter 11 as illustrated by arrows 14, plant 14 extends through the central opening 15 while wicks 12 address the enclosed soil 13 within planter 11.

Once reservoir 10 is filled with water, the water passes in a controlled manner through wicks 12 to irrigate plant 14.

The home-owner/user is able to easily see if reservoir 10 needs to be refilled. In this embodiment, water is not added directly to soil 13.

Figure 2:
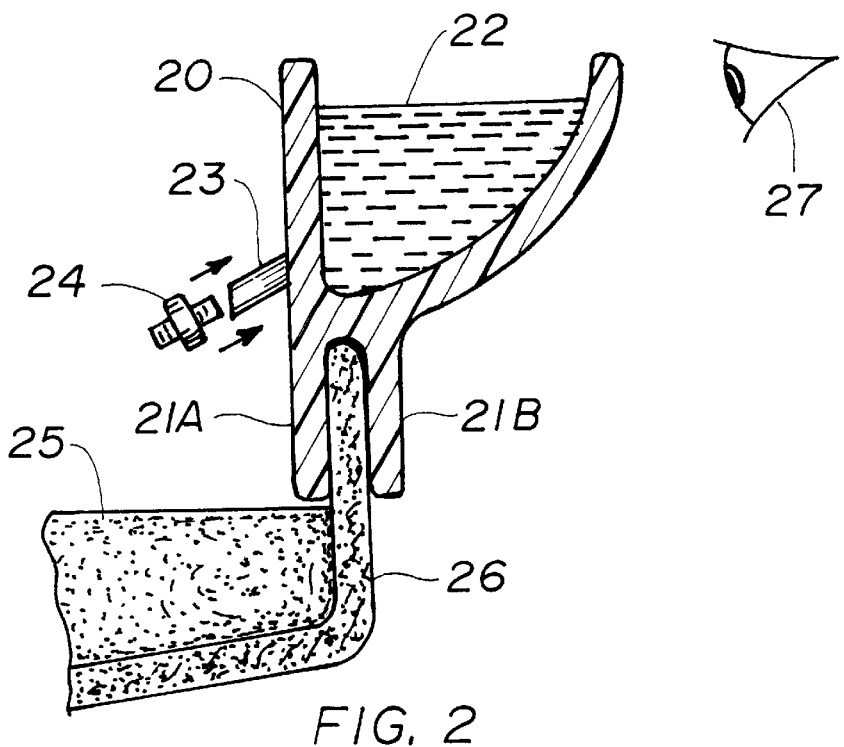
FIG. 2 is a cut-away view of an alternative embodiment of the invention in which an emitter is used.

FIG. 2 is a cut-away view of an alternative embodiment of the invention in which an emitter is used.

Timed irrigation system 20 includes a reservoir 22. Irrigation system 20 is secured to an upper rim of planter 26 using prongs 21A and 21B. Once positioned, water within reservoir 22 is fed without restriction through tubing 23.

Emitter 24 is secured to the end of tubing 23. Emitter 24 controls the flow of water into soil 25. The user/operator is able to replace a particular emitter 24 with another to define the rate of flow of water through the emitter. In one embodiment of the invention, several different emitters are provided to the user so that the desired affect is obtained.

In this embodiment, reservoir 22 is made of a substantially clear material such as plastic. This allows user 27 to gauge the level the water within reservoir 22.

Figures 3A, 3B:
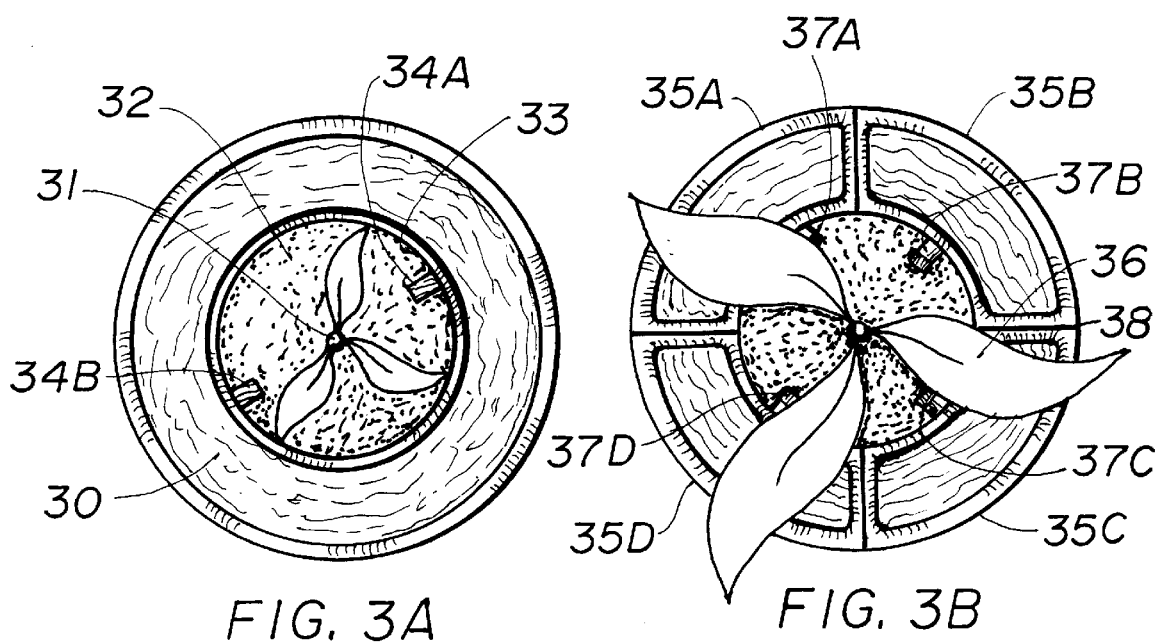
FIGS. 3A and 3B are top view illustrating two different embodiments of the invention.

FIGS. 3A and 3B are top view illustrating two different embodiments of the invention.

Referring to FIG. 3A, reservoir 30 surround plant 31 which is small enough to fit through opening 33. Wicks 34A and 34B drip water from reservoir 30 into soil 32 to provide the irrigation of plant 32.

FIG. 3B illustrates an embodiment of the invention in which the plant is too large to easily slip the reservoir over the plant.

In this embodiment, four segments 35A, 35B, 35C, and 35D are connected around the base of plant 36 so that the leaves of plant 36 are not disturbed. Each segment is connected to the other using a male-female interconnection mechanism 38, and operate independently of each other. Emitters 37A, 37B, 37C, and 37D, allow water from each reservoir to be fed into the planter.

For mature larger plants, this embodiment is particularly useful as the upper portion of the plant is not disturbed whatsoever during the installation of the irrigation system.

Figure 4:
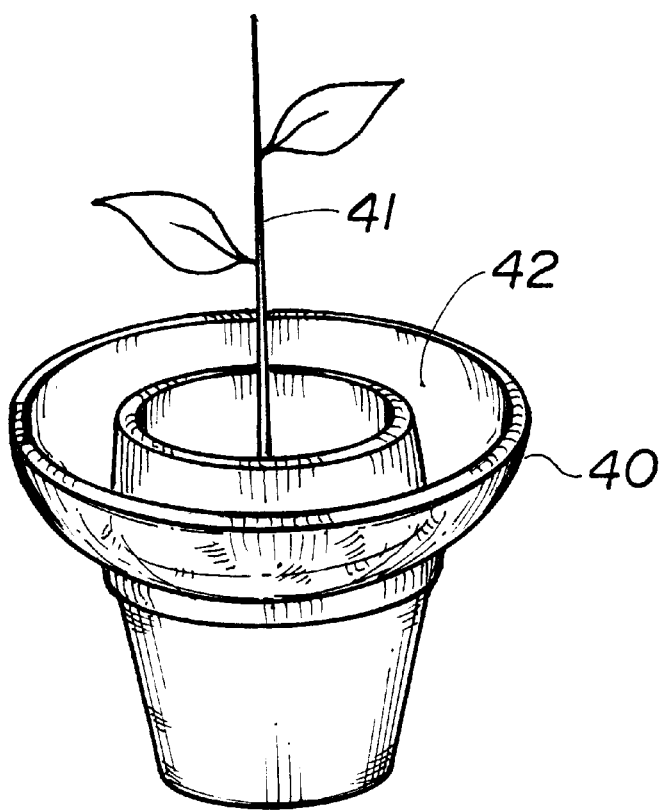
FIG. 4 illustrates an embodiment of the invention in which the irrigation system and the planter are a single unit.

FIG. 4 illustrates an embodiment of the invention in which the irrigation system and the planter are a single unit.

As shown, planter 40 is equipped with the same system of reservoir 42 and wick (not visible at this angle). Plant 41 is placed within planter 40 and raised.

Figure 5:
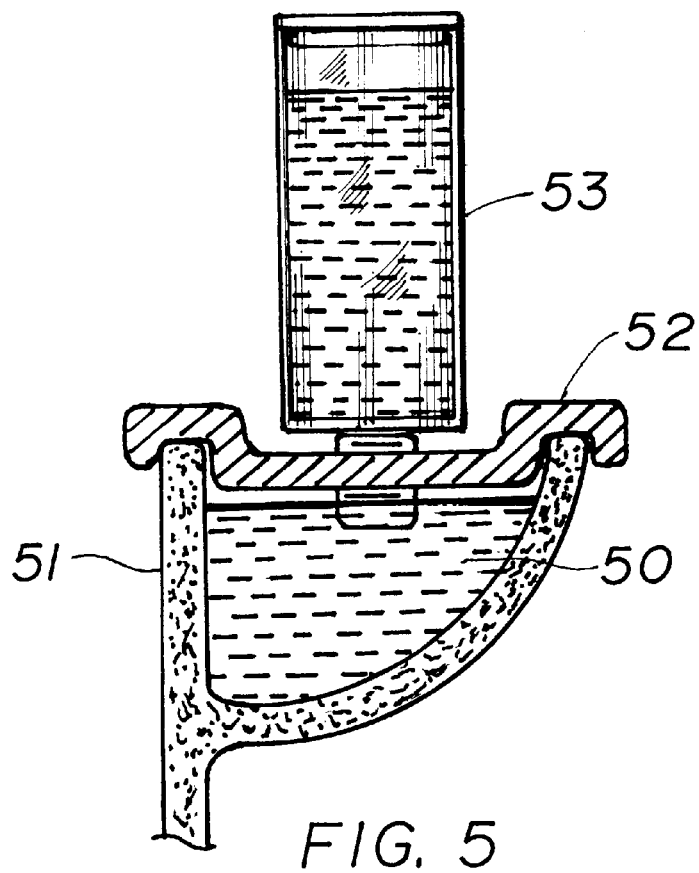
FIG. 5 illustrates an embodiment of the invention in which a second reservoir is used to maintain water within the primary reservoir.

FIG. 5 illustrates an embodiment of the invention in which a second reservoir is used to maintain water within the primary reservoir.

Primary reservoir 50 of irrigation 51 is mounted to the rim of the planter as outlined above. In this embodiment, frame 52 is placed over the top of reservoir 50 and bottle 53, (containing water) is secured thereto.

As the water within reservoir 50 falls, water from bottle 53 replenishes reservoir 50.

This embodiment is useful for when the home-owner/user is going to be away for an extended period of time.

FIG. 6 illustrates an embodiment of the invention wherein the reservoir hangs below the rim of the planter.

In this embodiment, reservoir 61 hangs from an upper rim of planter 60. Wick 63 extends from the bottom of reservoir 61 and is secured in place using clips 64A and 64B. The use of clip 64B assures that as water level 62 falls, wick 63 is still able to draw water from reservoir 61 into the interior of planter 60.

FIGS. 7A and 7B are side and frontal views of an embodiment of the invention in which the wick is used to occlude an opening at the bottom of irrigation reservoir.

Reservoir 70 is configured to rest on the upper rim of planter 73. Opening 71 located at the bottom of reservoir 70 allows wick 72 to communicate water from reservoir 70 into the interior of the planter 73. Opening 71 is fully occluded by wick 72; thereby assuring that only a slow drain is created for the irrigation operation.

Figure 8A:
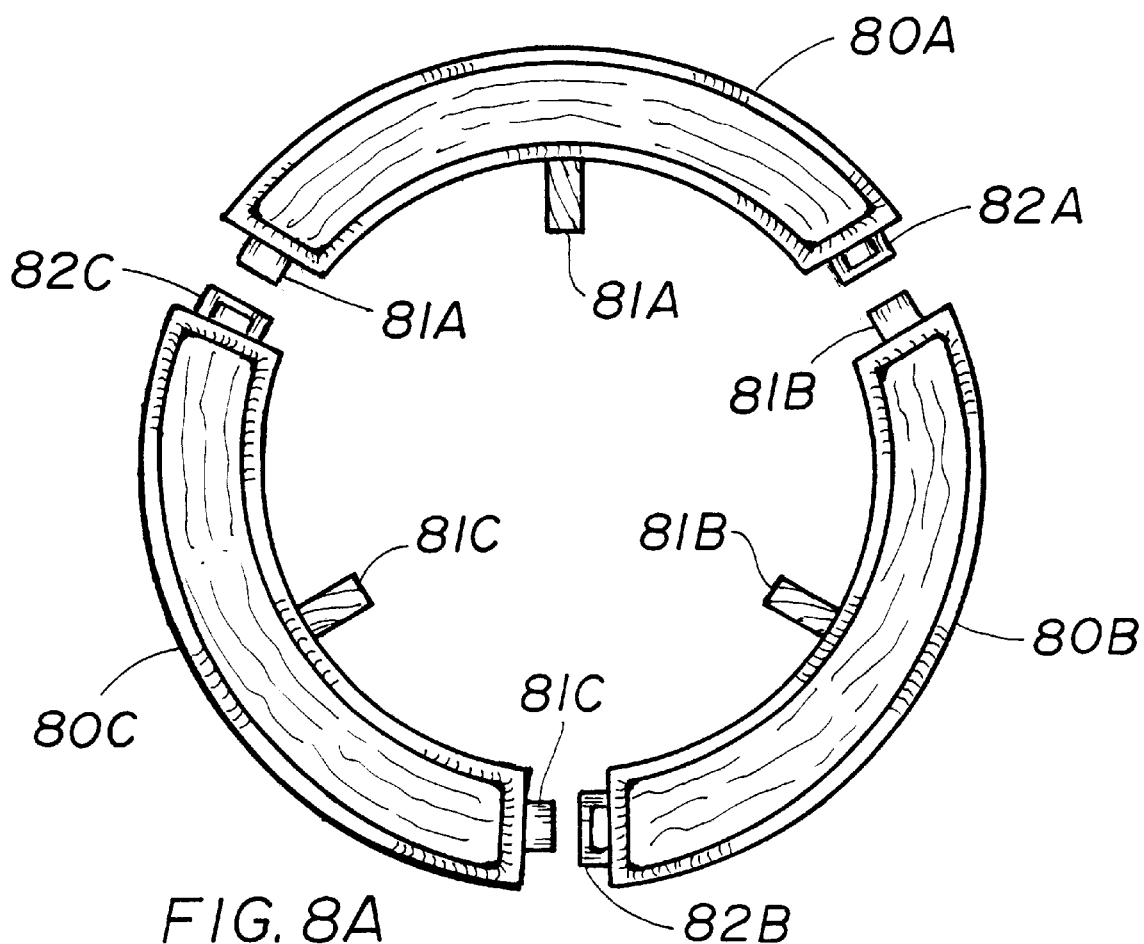
FIGS. 8A and 8B are top and side views of an interlocking embodiment of the invention.
Figure 8B:
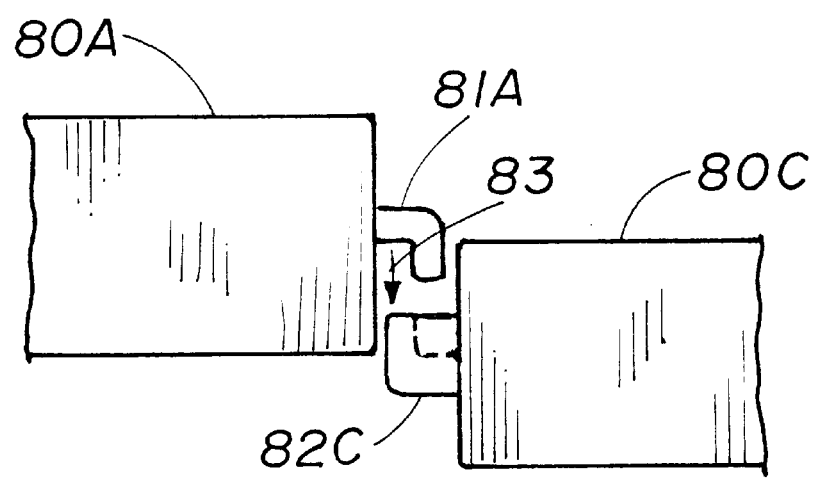

FIGS. 8A and 8B are top and side views of an interlocking embodiment of the invention.

This embodiment uses three reservoirs 80A, 80B, and 80C which, when fully assembled, form an entire circle. This embodiment though contemplates the use of only a single reservoir which would only partially encircle the planter.

While this figure illustrates the use of three reservoirs to fully encircle the planter, those of ordinary skill in the art readily recognize that any number of reservoirs to fully encircle the planter's rim are contemplated. As example, four, five, or six reservoirs may be joined as outlined below.

In this embodiment, each reservoir is a self contained unit with its own wick 81A, 81B, and 81C.

Reservoirs 80A, 80B and 80C, are connected using male connectors 81A, 81B, and 81C which engage female receivers 82A, 82B, and 82C.

FIG. 8B illustrates how reservoir 80A is moved (as indicated by arrow 83) relative to reservoir 80C. This cause male connector 81A to engage a slot within female receiver 82C. Once all of the reservoirs are interconnected, a series of reservoirs is firmly created.

Figure 9:
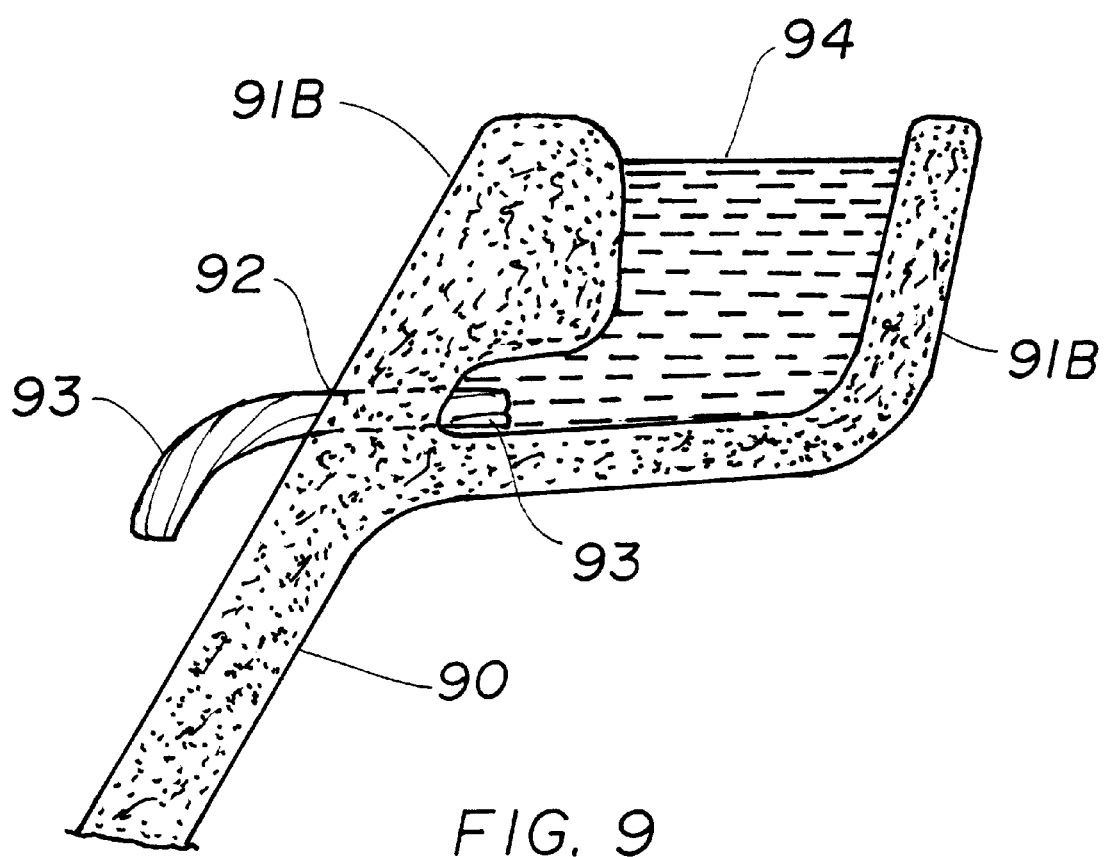
FIG. 9 is a side view in which the reservoir is incorporated into planter during manufacture.

FIG. 9 is a side view in which the reservoir is incorporated into planter during manufacture.

In this embodiment, planter 90 is formed having an extension 91B which totally encircles rim portion 91B. This forms a reservoir 94 therebetween. While the present illustration shows the reservoir 94 located on the outside of the planter, in another embodiment of the invention, the reservoir is placed on an interior portion of the planter.

Reservoir 94 is able to communicate water to the plant within the planter using wick 93 which extends through opening 92.

It is clear the present invention provides a highly reliable apparatus for irrigating potted plants.

What is claimed is:

1. A planter assembly comprising:
    a) a container adapted to receive a live plant and a soil-like medium;
    b) a primary reservoir positioned near an upper rim of said container, wherein said primary reservoir encircles at least one third of the upper rim of said container; and,
    c) a wick positioned to draw water from said primary reservoir and into said soil-like medium.

2. The planter assembly according to claim 1, wherein said primary reservoir is supported by the upper rim of said container.

3. The planter assembly according to claim 1, wherein said primary reservoir is substantially clear allowing the water within said primary reservoir to be visible through a wall of said primary reservoir.

4. The planter assembly according to claim 1, wherein said wick extends over an edge of said primary reservoir.

5. The planter assembly according to claim 4, further including means for securing one end of said wick proximal to a bottom of said primary reservoir.

6. The planter assembly according to claim 1,
    a) wherein said primary reservoir includes an opening located near a bottom of said primary reservoir; and,
    b) wherein said wick extends through said opening.

7. The planter assembly according to claim 1, wherein said primary reservoir and said wick are removable from said container.

8. The planter assembly according to claim 1, wherein said primary reservoir totally encircles the upper rim of said container.

9. The planter assembly according to claim 1, further including:
   a) a second reservoir securable near the upper rim of said container; and,
   b) a second wick positioned to draw water from said second reservoir into said soil-like medium.

10. The planter assembly according to claim 9, wherein said second reservoir includes a catch mechanism adapted to secure said second reservoir to said primary reservoir.

11. The planter assembly according to claim 7, wherein said primary reservoir hangs outside said container and is supported by the rim of said container.

12. The planter assembly according to claim 1, wherein said primary reservoir is permanently affixed to said container.

13. The planter assembly according to claim 12, wherein said primary reservoir is positioned on an exterior wall of said container.

14. The planter assembly according to claim 1, further including an emitter connected to an end of said wick emitting water into said container.

15. The planter assembly according to claim 14, wherein said emitter is removable from said wick.

16. The planter assembly according to claim 1, further including a supply reservoir securable to said primary reservoir such that as said primary reservoir drains, water from said supply reservoir empties into said primary reservoir.

17. The planter assembly according to claim 16,
   a) wherein said supply reservoir has a single opening with a screw connector thereon; and,
   b) wherein said primary reservoir includes a screw receiver adapted to accept the screw connector of said supply reservoir.

18. A potted plant assembly comprising:
   a) a container;
   b) a soil-like medium within said container;
   c) a primary reservoir, positioned near an upper rim of said container;
   d) a supply reservoir having a single opening with a screw connector, wherein said primary reservoir includes a screw receiver adapted to accept the screw connector of said supply reservoir; and,
   e) a wick positioned to draw water from said primary reservoir and into said soil-like medium.

19. The potted plant assembly according to claim 18,
   a) wherein said primary reservoir is substantially clear and includes an opening located near a bottom of said primary reservoir; and,
   b) wherein said wick extends through and occludes the opening in said primary reservoir.

20. The potted plant assembly according to clam 18, wherein said primary reservoir totally encircles the upper rim of said container and is permanently affixed to said container.

21. The potted plant assembly according to claim 18,
   a) wherein said primary reservoir partially encircles the upper rim of said container;
   b) further including a second reservoir securable to an upper rim of said container and to said primary reservoir; and,
   c) further including a second wick positioned to draw water from said second reservoir into said soil-like medium.

* * * * *